US012278080B2

(12) United States Patent
Yun et al.

(10) Patent No.: US 12,278,080 B2
(45) Date of Patent: Apr. 15, 2025

(54) MICROFOCUS X-RAY SOURCE FOR GENERATING HIGH FLUX LOW ENERGY X-RAYS

(71) Applicant: Sigray, Inc., Concord, CA (US)

(72) Inventors: Wenbing Yun, Walnut Creek, CA (US); Janos Kirz, Berkeley, CA (US)

(73) Assignee: Sigray, Inc., Benicia, CA (US)

( * ) Notice: Subject to any disclaimer, the term of this patent is extended or adjusted under 35 U.S.C. 154(b) by 200 days.

(21) Appl. No.: 18/152,973

(22) Filed: Jan. 11, 2023

(65) Prior Publication Data

US 2023/0218247 A1 Jul. 13, 2023

Related U.S. Application Data

(60) Provisional application No. 63/299,341, filed on Jan. 13, 2022.

(51) Int. Cl.

*H01J 35/16* (2006.01)
*H01J 35/08* (2006.01)
*H01J 35/14* (2006.01)
*H01J 35/18* (2006.01)

(52) U.S. Cl.

CPC ............. *H01J 35/16* (2013.01); *H01J 35/112* (2019.05); *H01J 35/14* (2013.01); *H01J 35/18* (2013.01)

(58) Field of Classification Search

CPC .......... G21K 1/067; H01J 35/00; H01J 35/16; H01J 35/14; H01J 35/18; H01J 35/112; H01J 35/186; H01J 35/20

See application file for complete search history.

(56) References Cited

U.S. PATENT DOCUMENTS 1,203,495 A 10/1916 Coolidge
1,211,092 A 1/1917 Coolidge
1,215,116 A 2/1917 Coolidge
(Continued)

FOREIGN PATENT DOCUMENTS

CN 102124537 A 7/2011
CN 1917135 A 2/2012
(Continued)

OTHER PUBLICATIONS

Behling, "Medical X-ray sources Now and for the Future," Nucl. Inst. and Methods in Physics Research A 873, pp. 43-50 (2017).
(Continued)

*Primary Examiner* — Dani Fox
*Assistant Examiner* — Soorena Kefayati
(74) *Attorney, Agent, or Firm* — Knobbe, Martens, Olson & Bear, LLP

(57) ABSTRACT

An x-ray source includes an x-ray transmissive window having an x-ray transmittance greater than or equal to 20% for at least some x-rays having an x-ray energy less than 1 keV. The x-ray source further includes an electron source configured to generate at least one electron beam and an anode assembly configured to generate x-rays in response to electron bombardment by at least some of the electrons of the at least one electron beam from the electron source. The x-ray source further includes at least one x-ray optic is configured to receive at least some of the x-rays from the anode assembly and to direct at least some of the received x-rays to the window to form an x-ray beam.

30 Claims, 4 Drawing Sheets

(56) References Cited

U.S. PATENT DOCUMENTS

| | | | | |
|---|---|---|---|---|
| 1,328,495 | A | 1/1920 | Coolidge | |
| 1,355,126 | A | 10/1920 | Coolidge | |
| 1,790,073 | A | 1/1931 | Pohl | |
| 1,917,099 | A | 7/1933 | Coolidge | |
| 1,946,312 | A | 2/1934 | Coolidge | |
| 2,926,270 | A | 2/1960 | Zunick | |
| 3,795,832 | A | 3/1974 | Holland | |
| 3,894,239 | A | 7/1975 | Braun | |
| 4,165,472 | A | 8/1979 | Wittry | |
| 4,192,994 | A | 3/1980 | Kastner | |
| 4,227,112 | A | 10/1980 | Waugh et al. | |
| 4,266,138 | A | 5/1981 | Nelson et al. | |
| 4,523,327 | A | 6/1985 | Eversole | |
| 4,573,186 | A | 2/1986 | Reinhold | |
| 4,951,304 | A | 8/1990 | Piestrup et al. | |
| 4,972,449 | A | 11/1990 | Upadhya et al. | |
| 5,148,462 | A | 9/1992 | Spitsyn et al. | |
| 5,335,258 | A * | 8/1994 | Whitlock | H01J 35/065<br>378/119 |
| 5,371,774 | A | 12/1994 | Cerrina | |
| 5,416,820 | A | 5/1995 | Weil et al. | |
| 5,602,899 | A | 2/1997 | Larson | |
| 5,629,969 | A | 5/1997 | Koshishiba | |
| 5,657,365 | A | 8/1997 | Yamamoto et al. | |
| 5,729,583 | A | 3/1998 | Tang et al. | |
| 5,737,387 | A | 4/1998 | Smither | |
| 5,825,848 | A | 10/1998 | Virshup et al. | |
| 5,857,008 | A | 1/1999 | Reinhold | |
| 5,878,110 | A | 3/1999 | Yamamoto et al. | |
| 5,978,448 | A | 11/1999 | Bristol | |
| 6,118,853 | A | 9/2000 | Hansen et al. | |
| 6,125,167 | A | 9/2000 | Morgan | |
| 6,185,277 | B1 | 2/2001 | Harding | |
| 6,307,916 | B1 | 10/2001 | Rogers et al. | |
| 6,377,660 | B1 | 4/2002 | Ukita et al. | |
| 6,430,260 | B1 | 8/2002 | Snyder | |
| 6,463,123 | B1 | 10/2002 | Korenev | |
| 6,487,272 | B1 | 11/2002 | Kutsuzawa | |
| 6,553,096 | B1 | 4/2003 | Zhou et al. | |
| 6,560,313 | B1 | 5/2003 | Harding et al. | |
| 6,560,315 | B1 | 5/2003 | Price et al. | |
| 6,707,883 | B1 | 3/2004 | Tiearney et al. | |
| 6,850,598 | B1 | 2/2005 | Fryda et al. | |
| 6,947,522 | B2 | 9/2005 | Wilson et al. | |
| 6,975,703 | B2 | 12/2005 | Wilson et al. | |
| 7,003,077 | B2 | 2/2006 | Jen et al. | |
| 7,023,950 | B1 | 4/2006 | Annis | |
| 7,079,625 | B2 | 7/2006 | Lenz | |
| 7,180,981 | B2 | 2/2007 | Wang | |
| 7,215,741 | B2 | 5/2007 | Ukita et al. | |
| 7,218,700 | B2 | 5/2007 | Huber et al. | |
| 7,218,703 | B2 | 5/2007 | Yada et al. | |
| 7,330,533 | B2 | 2/2008 | Sampayon | |
| 7,346,148 | B2 | 3/2008 | Ukita | |
| 7,349,525 | B2 | 3/2008 | Morton | |
| 7,359,487 | B1 | 4/2008 | Newcome | |
| 7,382,864 | B2 | 6/2008 | Hebert et al. | |
| 7,443,953 | B1 | 10/2008 | Yun et al. | |
| 7,443,958 | B2 | 10/2008 | Harding | |
| 7,522,707 | B2 | 4/2009 | Steinlage et al. | |
| 7,529,343 | B2 | 5/2009 | Safai et al. | |
| 7,551,722 | B2 | 6/2009 | Ohshima et al. | |
| 7,601,399 | B2 | 10/2009 | Barnola et al. | |
| 7,672,433 | B2 | 3/2010 | Zhong et al. | |
| 7,873,146 | B2 | 1/2011 | Okunuki et al. | |
| 7,876,883 | B2 | 1/2011 | O'Hara | |
| 7,889,844 | B2 | 2/2011 | Okunuki et al. | |
| 7,929,667 | B1 | 4/2011 | Zhuang et al. | |
| 7,991,120 | B2 | 8/2011 | Okunuki et al. | |
| 8,036,341 | B2 | 11/2011 | Lee | |
| 8,094,784 | B2 | 1/2012 | Morton | |
| 8,139,711 | B2 | 3/2012 | Takahashi | |
| 8,139,716 | B2 | 3/2012 | Okunuki et al. | |
| 8,208,603 | B2 | 6/2012 | Sato | |
| 8,243,884 | B2 | 8/2012 | Rödhammer et al. | |
| 8,306,184 | B2 | 11/2012 | Chang et al. | |
| 8,331,534 | B2 | 12/2012 | Silver | |
| 8,351,569 | B2 | 1/2013 | Baker | |
| 8,360,640 | B2 | 1/2013 | Reinhold | |
| 8,406,378 | B2 | 3/2013 | Wang et al. | |
| 8,416,920 | B2 | 4/2013 | Okumura et al. | |
| 8,422,637 | B2 | 6/2013 | Okunuki et al. | |
| 8,509,386 | B2 | 8/2013 | Lee et al. | |
| 8,520,803 | B2 | 8/2013 | Behling | |
| 8,553,843 | B2 | 10/2013 | Drory | |
| 8,588,372 | B2 | 11/2013 | Zou et al. | |
| 8,644,451 | B2 | 2/2014 | Aoki et al. | |
| 8,666,024 | B2 | 3/2014 | Okunuki et al. | |
| 8,699,667 | B2 | 4/2014 | Steinlage et al. | |
| 8,831,179 | B2 | 9/2014 | Adler et al. | |
| 8,837,680 | B2 | 9/2014 | Tsujii | |
| 8,861,682 | B2 | 10/2014 | Okunuki et al. | |
| 8,989,351 | B2 | 3/2015 | Vogtmeier et al. | |
| 8,995,622 | B2 | 3/2015 | Adler et al. | |
| 9,008,278 | B2 | 4/2015 | Lee et al. | |
| 9,020,101 | B2 | 4/2015 | Omote et al. | |
| 9,029,795 | B2 | 5/2015 | Sando | |
| 9,251,995 | B2 | 2/2016 | Ogura | |
| 9,257,254 | B2 | 2/2016 | Ogura et al. | |
| 9,263,225 | B2 | 2/2016 | Morton | |
| 9,281,158 | B2 | 3/2016 | Ogura | |
| 9,362,081 | B2 | 6/2016 | Bleuet | |
| 9,390,881 | B2 | 7/2016 | Yun et al. | |
| 9,412,552 | B2 | 8/2016 | Aoki et al. | |
| 9,448,190 | B2 | 9/2016 | Yun et al. | |
| 9,449,780 | B2 | 9/2016 | Chen | |
| 9,449,781 | B2 | 9/2016 | Yun et al. | |
| 9,502,204 | B2 | 11/2016 | Ikarashi | |
| 9,520,260 | B2 | 12/2016 | Hesselink et al. | |
| 9,524,846 | B2 | 12/2016 | Sato et al. | |
| 9,543,109 | B2 | 1/2017 | Yun et al. | |
| 9,564,284 | B2 | 2/2017 | Gerzoskovitz | |
| 9,570,264 | B2 | 2/2017 | Ogura et al. | |
| 9,570,265 | B1 | 2/2017 | Yun et al. | |
| 9,594,036 | B2 | 3/2017 | Yun et al. | |
| 9,595,415 | B2 | 3/2017 | Ogura | |
| 9,715,989 | B2 | 7/2017 | Dalakos et al. | |
| 9,823,203 | B2 | 11/2017 | Yun et al. | |
| 9,934,930 | B2 | 4/2018 | Parker et al. | |
| 9,984,847 | B2 | 5/2018 | Shirota et al. | |
| 10,014,148 | B2 | 7/2018 | Tang et al. | |
| 10,020,158 | B2 | 7/2018 | Yamada | |
| 10,068,740 | B2 | 9/2018 | Gupta | |
| 10,105,112 | B2 * | 10/2018 | Utsumi | A61B 6/025 |
| 10,115,557 | B2 | 10/2018 | Ishii | |
| 10,217,596 | B2 | 2/2019 | Liang et al. | |
| 10,264,659 | B1 | 4/2019 | Miller et al. | |
| 10,269,528 | B2 | 4/2019 | Yun et al. | |
| 10,297,359 | B2 | 5/2019 | Yun et al. | |
| 10,366,860 | B2 | 7/2019 | Parker et al. | |
| 10,658,145 | B2 | 5/2020 | Yun et al. | |
| 10,743,396 | B1 | 8/2020 | Kawase | |
| 10,841,515 | B1 | 11/2020 | Tsujino | |
| 10,847,336 | B2 | 11/2020 | Durst et al. | |
| 2002/0064253 | A1 | 5/2002 | Gutman | |
| 2002/0085676 | A1 | 7/2002 | Snyder | |
| 2003/0021377 | A1 | 1/2003 | Turner et al. | |
| 2003/0142790 | A1 | 1/2003 | Zhou et al. | |
| 2004/0076260 | A1 | 4/2004 | Charles, Jr. | |
| 2004/0120463 | A1 | 6/2004 | Wilson et al. | |
| 2004/0140432 | A1 | 7/2004 | Maldonado et al. | |
| 2005/0074094 | A1 | 4/2005 | Jen et al. | |
| 2005/0123097 | A1 | 6/2005 | Wang | |
| 2005/0201520 | A1 | 9/2005 | Smith et al. | |
| 2006/0233309 | A1 | 10/2006 | Kutzner et al. | |
| 2007/0071174 | A1 | 3/2007 | Hebert et al. | |
| 2007/0108396 | A1 | 5/2007 | Reinhold | |
| 2007/0110217 | A1 | 5/2007 | Ukita | |
| 2007/0140420 | A1 | 6/2007 | Radley et al. | |
| 2007/0248215 | A1 | 10/2007 | Ohshima et al. | |
| 2008/0084966 | A1 | 4/2008 | Aoki et al. | |
| 2008/0089484 | A1 | 4/2008 | Reinhold | |
| 2008/0137812 | A1 | 6/2008 | Frontera et al. | |
| 2008/0170668 | A1 | 7/2008 | Kruit et al. | |

(56) References Cited

U.S. PATENT DOCUMENTS

| | | | |
|---|---|---|---|
| 2009/0316860 A1 | 12/2009 | Okunuki et al. | |
| 2010/0027739 A1 | 2/2010 | Lantz et al. | |
| 2010/0040202 A1* | 2/2010 | Lee | H01J 35/112 378/143 |
| 2010/0141151 A1 | 6/2010 | Reinhold | |
| 2010/0201240 A1 | 8/2010 | Heinke et al. | |
| 2011/0026680 A1 | 2/2011 | Sato | |
| 2011/0038455 A1 | 2/2011 | Silver et al. | |
| 2011/0058655 A1 | 3/2011 | Okumura et al. | |
| 2011/0064202 A1 | 3/2011 | Thran et al. | |
| 2011/0085641 A1 | 4/2011 | Okunuki et al. | |
| 2011/0135066 A1 | 6/2011 | Behling | |
| 2011/0142204 A1 | 6/2011 | Zou et al. | |
| 2011/0235781 A1 | 9/2011 | Aoki et al. | |
| 2012/0057669 A1 | 3/2012 | Vogtmeier et al. | |
| 2012/0163547 A1 | 6/2012 | Lee et al. | |
| 2012/0269323 A1 | 10/2012 | Adler et al. | |
| 2012/0269324 A1 | 10/2012 | Adler | |
| 2012/0269325 A1 | 10/2012 | Adler et al. | |
| 2012/0269326 A1 | 10/2012 | Adler et al. | |
| 2013/0108012 A1 | 5/2013 | Sato | |
| 2013/0195246 A1 | 8/2013 | Tamura et al. | |
| 2013/0223594 A1 | 8/2013 | Sprong et al. | |
| 2013/0235976 A1 | 9/2013 | Jeong et al. | |
| 2013/0259207 A1 | 10/2013 | Omote et al. | |
| 2013/0308754 A1 | 11/2013 | Yamazaki et al. | |
| 2014/0029729 A1* | 1/2014 | Kucharczyk | H01J 35/106 378/123 |
| 2014/0072102 A1* | 3/2014 | Bleuet | G01N 23/046 378/62 |
| 2014/0079188 A1 | 3/2014 | Hesselink et al. | |
| 2014/0177800 A1 | 6/2014 | Sato et al. | |
| 2014/0185778 A1 | 7/2014 | Lee et al. | |
| 2014/0211919 A1 | 7/2014 | Ogura et al. | |
| 2014/0369469 A1 | 12/2014 | Ogura et al. | |
| 2014/0369471 A1 | 12/2014 | Ogura et al. | |
| 2015/0030127 A1 | 1/2015 | Aoki et al. | |
| 2015/0043713 A1 | 2/2015 | Chen | |
| 2015/0071402 A1 | 3/2015 | Handa | |
| 2015/0092923 A1 | 4/2015 | Iida et al. | |
| 2015/0092924 A1 | 4/2015 | Yun et al. | |
| 2015/0110252 A1 | 4/2015 | Yun et al. | |
| 2015/0194287 A1 | 7/2015 | Yun et al. | |
| 2015/0243397 A1 | 8/2015 | Yun et al. | |
| 2015/0247811 A1 | 9/2015 | Yun et al. | |
| 2015/0260663 A1 | 9/2015 | Yun et al. | |
| 2015/0311026 A1 | 10/2015 | Tsukamoto et al. | |
| 2015/0357069 A1 | 12/2015 | Yun et al. | |
| 2016/0064175 A1 | 3/2016 | Yun et al. | |
| 2016/0064177 A1 | 3/2016 | Gossmann et al. | |
| 2016/0066870 A1 | 3/2016 | Yun et al. | |
| 2016/0106387 A1 | 4/2016 | Kahn | |
| 2016/0174922 A1 | 6/2016 | Kodera et al. | |
| 2016/0178540 A1 | 6/2016 | Yun et al. | |
| 2016/0240343 A1 | 8/2016 | Mazellier et al. | |
| 2016/0268094 A1 | 9/2016 | Yun et al. | |
| 2016/0320320 A1 | 11/2016 | Yun et al. | |
| 2016/0336140 A1 | 11/2016 | Nonoguchi et al. | |
| 2016/0343538 A1 | 11/2016 | Kawanishi et al. | |
| 2016/0351370 A1 | 12/2016 | Yun et al. | |
| 2017/0018392 A1 | 1/2017 | Cheng | |
| 2017/0047191 A1 | 2/2017 | Yun et al. | |
| 2017/0110283 A1 | 4/2017 | Shirota et al. | |
| 2017/0133192 A1 | 5/2017 | Ogura et al. | |
| 2017/0162288 A1 | 6/2017 | Yun et al. | |
| 2017/0162359 A1 | 6/2017 | Tang et al. | |
| 2017/0176356 A1 | 6/2017 | Hoffman et al. | |
| 2017/0200580 A1* | 7/2017 | Miller | H01J 35/116 |
| 2017/0261442 A1 | 9/2017 | Yun et al. | |
| 2017/0287673 A1* | 10/2017 | Peterson | H01J 35/186 |
| 2018/0144901 A1* | 5/2018 | Yun | H01J 35/30 |
| 2018/0202951 A1 | 7/2018 | Yun et al. | |
| 2018/0301312 A1* | 10/2018 | Haig | H01J 35/16 |
| 2018/0323032 A1 | 11/2018 | Strelec et al. | |
| 2019/0017942 A1 | 1/2019 | Filevich | |
| 2019/0019647 A1 | 1/2019 | Lee et al. | |
| 2019/0057832 A1 | 2/2019 | Durst et al. | |
| 2019/0088439 A1 | 3/2019 | Honda | |
| 2019/0115184 A1 | 4/2019 | Zalubovsky | |
| 2019/0131103 A1* | 5/2019 | Tuohimaa | H01J 35/20 |
| 2019/0132936 A1 | 5/2019 | Steck et al. | |
| 2019/0148102 A1 | 5/2019 | Maltz | |
| 2019/0189385 A1 | 6/2019 | Liang et al. | |
| 2019/0214216 A1 | 7/2019 | Jeong et al. | |
| 2019/0252149 A1* | 8/2019 | Silver | H01J 35/16 |
| 2019/0304735 A1 | 10/2019 | Safai et al. | |
| 2019/0311874 A1 | 10/2019 | Tuohimma et al. | |
| 2019/0341219 A1 | 11/2019 | Zhang et al. | |
| 2019/0341220 A1 | 11/2019 | Parker et al. | |
| 2019/0380193 A1 | 12/2019 | Matsuhana et al. | |
| 2019/0387602 A1 | 12/2019 | Woywode et al. | |
| 2020/0035440 A1* | 1/2020 | Yun | H01J 35/30 |
| 2020/0041429 A1 | 2/2020 | Cho et al. | |
| 2020/0058462 A1 | 2/2020 | Suzuki | |
| 2020/0098537 A1 | 3/2020 | Yun et al. | |
| 2020/0105492 A1 | 4/2020 | Behling et al. | |
| 2020/0154552 A1 | 5/2020 | Suzuki et al. | |
| 2020/0163195 A1 | 5/2020 | Steck et al. | |
| 2020/0168427 A1 | 5/2020 | Krokhmal et al. | |
| 2020/0187339 A1 | 6/2020 | Freudenberger et al. | |
| 2020/0194212 A1 | 6/2020 | Dalakos et al. | |
| 2020/0203113 A1 | 6/2020 | Ponard | |
| 2020/0234908 A1 | 7/2020 | Fishman et al. | |
| 2020/0305809 A1 | 10/2020 | Schwoebel et al. | |
| 2020/0321184 A1 | 10/2020 | Parker et al. | |
| 2020/0365361 A1 | 11/2020 | Yun et al. | |
| 2020/0388461 A1 | 12/2020 | Behling et al. | |
| 2021/0020398 A1 | 1/2021 | Yun et al. | |

FOREIGN PATENT DOCUMENTS

| | | |
|---|---|---|
| CN | 209656591 U | 11/2019 |
| DE | 19633860 A1 | 2/1997 |
| EP | 0432568 | 6/1991 |
| EP | 1028451 | 8/2000 |
| EP | 3093867 A1 | 11/2016 |
| FR | 2548447 | 1/1985 |
| JP | H06-188092 | 7/1994 |
| JP | H07-056000 | 3/1995 |
| JP | 2000-306533 | 11/2000 |
| JP | 2003-288853 | 10/2003 |
| JP | 2004-089445 | 3/2004 |
| JP | 2004-518262 | 6/2004 |
| JP | 2006-164819 | 6/2006 |
| JP | 2007-265981 | 10/2007 |
| JP | 2007-311185 | 11/2007 |
| JP | 2008-145111 | 6/2008 |
| JP | 2009-195349 | 3/2009 |
| JP | 2009-212058 | 9/2009 |
| JP | 2011-029072 | 2/2011 |
| JP | 2013-157269 | 8/2013 |
| JP | 2013-160637 | 8/2013 |
| JP | 2013-239317 | 11/2013 |
| JP | 2015-002074 | 1/2015 |
| JP | 2016-537797 | 12/2016 |
| WO | WO 1995/006952 | 3/1995 |
| WO | WO 1998/011592 | 3/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/135811 | 11/2007 |
| WO | WO 2009/098027 | 8/2009 |
| WO | WO 2010/109909 | 9/2010 |
| WO | WO 2013/118593 | 8/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/084466 | 6/2015 |
| WO | WO 2015/152490 | 10/2015 |
| WO | WO 2015/187219 | 12/2015 |
| WO | WO 2017/204850 | 11/2017 |

(56) References Cited

FOREIGN PATENT DOCUMENTS

OTHER PUBLICATIONS

Bjeoumikhov et al., "A modular system for XRF and XRD applications consisting of a microfocus X-ray source and different capillary optics," X-ray Spectrometry, vol. 33 (2004), pp. 312-316.
Chervenak et al., "Experimental thick-target bremsstrahlung spectra from electrons in the range 10 to 30 keV", Phys. Rev. A vol. 12 (1975), pp. 26-33.
Espes et al., "High-resolution X-ray source with advanced e-beam technology: pushing the resolution limitation for lab-scale NanoCT," Micros. Microanal., vol. 27 (Suppl. 1), pp. 1230 (2021).
Gonzales et al., "Angular distribution of thick-target bremsstrahlung produced by electrons with initial energies ranging from 10 to 20 keV incident on Ag", Phys. Rev. A vol. 84 (2011): 052726.
Gonzales et al., "Angular Distribution of Bremsstrahlung Produced by 10-Kev And 20 Kev Electrons Incident On A Thick Au Target", in Application of Accelerators in Research and Industry, AIP Conf. Proc. 1221 (2013), pp. 114-117.
Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).
Ihsan et al., "A microfocus X-ray tube based on a microstructured X-ray target", Nuclear Instruments and Methods in Physics Research B vol. 267 (2009) pp. 3566-3573.
Jin et al., "Development of an X-ray tube with two selective targets modulated by a magnetic field," Rev. Sci. Inst. vol. 90, 083105 (2019).
Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.
Li et al., "Study on High Thermal Conductivity of X-ray Anode with Composite Diamond Substrate," J. Phys.: Conf. Ser., vol. 1300, 012115 (2019).
Li et al., "Production and Heat Properties of an X-ray Reflective Anode Based on a Diamond Heat Buffer Layer," Materials vol. 13, p. 241 (2020).
Luani, "Optimization of e-beam and x-ray target geometry of a solid x-ray anode source," Uppsala Universitet, Dept. of Physics, Thesis for Masters degree in physics (2021).
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Nojeh, "Carbon Nanotube Electron Sources: From Electron Beams to Energy Conversion and Optophononics", ISRN Nanomaterials vol. 2014 (2014): 879827.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Poludniowski et al., "Technical Note: SpekPy v2.0—a software toolkit for modelling x-ray tube spectra," doi: 10.1002/MP.14945 (2021).
Riege, "Electron Emission from Ferroelectrics—A Review", Cern Report Cern AT/93-18 (Cern, Geneva, Switzerland, Jul. 1993).
Scholz, "X-ray Tubes and Monochromators," Technical Workshop EPIC, Universität Würzburg (2007); 41 slides, 2007.
Shimura et al., "Hard x-ray phase contrast imaging using a tabletop Talbot-Lau interferometer with multiline embedded x-ray targets", Opt. Lett. vol. 38(2) (2013), pp. 157-159.
Stupple et al., "Modeling of Heat Transfer in an Aluminum X-Ray Anode Employing a Chemical Vapor Deposited Diamond Heat Spreader," J. Heat Transfer, Vo. 140, 124501-1—Dec. 5, 2018.
Tucker, "Design of X-Ray Source for Real-Time Computed Tomography," Dissertation, Missouri Univ. of Sci. and Tech., Scholars' Mine, 104 pages (2020).
Wang et al., "High beam-current density of a 10-keV nano-focus X-ray source," Nucl. Inst. And Meth. A940, 475-478 (2019).
Wansleben et al., "Photon flux determination of a liquid-metal jet x-ray source by means of photon scattering," arXiv:1903.06024v1, Mar. 14, 2019.
Yamamoto, "Fundamental physics of vacuum electron sources", Reports on Progress in Physics vol. 69, (2006), pp. 181-232.
Yan et al., "X-ray source design optimization using differential evolution algorithms—A case study," Rev. Sci. Instrum. 93, 053101 (2022).
Zhou et al., "A study of new type electric field modulation multi-target X-ray source," Nucl. Inst. and Methods in Physics Research A, https://doi.org/10.1016/ j.nima.2020.164342 (2020).
Behling et al., "Nearly Monochromatic Bremsstrahlung of High Intensity via Microparticle Targets: A Novel Concept", Instruments, vol. 8, p. 42, 2024.
Behling et al., "A compact X-ray source via fast microparticle streams", Communication Engineering, vol. 3, No. 171, 2024, 9 pages.
Behling et al., "The impact of tube voltage on the erosion of rotation x-ray anodes", Med. Phys. doi.org/10.1002/mp.17528 (2024).
Boin et al., "Operating Liquid Metaljet X-Ray Sources for Materials Research", 67th ICFA Adv. Bean Dyn. Workshop Future Light Sources, doi:10.18429/JACoW-FLS2023-WE1L4, 2023, 5 pages.
Bryant, "A new x-ray source technology for demanding SMT and Semiconductor inspection (Impact 23, S20-3)", doi: 10.1109/ IMPACT59481.2023.10348903, 2023, 5 pages.
Dazheng et al., "Enhanced slit methodology for characterization of x-ray focal properties", X-Ray Spectrometry, pp. 1-12, 2024.
Flenner et al., "Dual-beam X-ray nano-holotomography", Journal of Synchrotron Radiation, https://doi.org/10.1107/51600577524003801, vol. 31, 2024, 7 pages.
Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).
Kang et al., "Cold Cathode Flat Panel X-ray Source for Talbot-Lau Grating Interferometer using Zinc Oxide Nanowire Field Emitter Arrays and Periodic Microstructured Anode", ACS Applied Nano Materials, doi.org/10.1021/acsanm.4c04410, 2024, 8 pages.
Liu et al., "Effect of diamond crystal structure on anode heat transfer rate of X-ray source", Sixth Conf. Frontiers in Op. Imaging and Tech., Proc. SPIE vol. 13153, doi: 10.1117/12.3019386, 2024, 8 pages.
Pramanik et al., "Fundamental scaling laws of water-window X-rays from free-electron-driven van der Waals structures", Nature Photonics, vol. 18, pp. 1203-1211, 2024.
Robb, "Small tunable X-ray sources may have large impact," Nature Photonics, vol. 18, pp. 1129-1130, 2024.
Shi et al., "Single crystalline molybdenum nanostructure for generating reflective microfocal spot X-rays: Structure-controllable preparation and characteristic-selectable radiation", Results in Physics, doi: 10.1016/j.rinp.2024.107723, 2024, 17 pages.
Urbanski et al., "MEMS-Compatible X-Ray Source", Journal of Microelectromechanical Systems, https://doi.org/10.1109/JMEMS. 2024.3426111, 2024, 3 pages.
Urbanski et al., "Optimization of the Transmission X-Ray Target Toward Obtaining Monochromatic Radiation", Advanced Optical Materials, 2024, 7 pages.
Watts et al., "The development of laboratory-based high energy sources for XPS", Surface and Interface Analysis, pp. 1-17, doi: 10.1002/sia.7300, 2023.
Wirtensohn et al., "Nanoscale dark-field imaging in full-field transmission X-ray microscopy", Optica, vol. 11, No. 6, doi.org/10.1364/ optica.524812, 2024, 8 pages.
Yang et al., "Effective focal spot measurement method for X-ray source based on the dynamic translation of a light barrier", Optics Express, vol. 32, No. 31, pp. 2982-3005, 2024.
Yu et al., "Size characterization of x-ray tube source with sphere encoded imaging method," Review of Science Instruments, vol. 95, 013102, 2024, 7 pages.

(56) References Cited

OTHER PUBLICATIONS

Yuan et al., "Performance characterization of an Al2O3/HfO2 parabolic multilayer based on a laboratory X-ray source", Applied Optics, vol. 63, No. 22, https://doi.org/10.1364/AO.531983, 2024, 6 pages.
Zhao et al., "Practical design of the focusing system for transmission and reflection targets in X-ray sources," Nuclear Inst. and Methods in Physics Research, A, https://doi.org/10,1016/j.nima.2024.169655, 2024, 26 pages.

* cited by examiner

MICROFOCUS X-RAY SOURCE FOR GENERATING HIGH FLUX LOW ENERGY X-RAYS

CLAIM OF PRIORITY

This application claims the benefit of priority to U.S. Provisional Appl. No. 63/299,341 filed on Jan. 13, 2022 and incorporated in its entirety by reference herein.

BACKGROUND

Field

The present application discloses x-ray sources for generating x-rays by electron bombardment.

Description of the Related Art

One widely used method and system for generating x-rays is to impact an anode with energetic electrons generated by an electron column. The anode material, such as copper (Cu) or molybdenum (Mo), is selected for its x-ray spectral properties (e.g., for its characteristic fluorescent x-rays). Because electrons strongly interact with matter (e.g., gas through which the electrons traverse while propagating from the electron column to the anode), the electron column and the x-ray anode are housed inside a vessel with vacuum better than $10^{-6}$ torr. Because it is highly inconvenient to use x-rays inside a high vacuum vessel for many applications (e.g., materials characterization/analysis/imaging), the vacuum vessel typically comprises an x-ray/vacuum window that allows x-rays to transmit through the window while separating the high vacuum region inside the vacuum vessel containing the electron column and the anode from the low/no vacuum region outside the vacuum vessel. Such conventional x-ray/vacuum windows have substantial transmittance for higher energy x-rays but low transmittance for low-energy x-rays.

SUMMARY

In certain implementations, an x-ray source comprises at least one housing configured to contain a first region at a pressure less than one atmosphere and configured to separate the first region from an ambient environment outside the at least one housing. The at least one housing comprises an x-ray transmissive window having an x-ray transmittance greater than or equal to 20% for at least some x-rays having an x-ray energy less than 1 keV. The x-ray source further comprises an electron source within the at least one housing. The electron source is configured to generate at least one electron beam. The x-ray source further comprises an anode assembly within the at least one housing and configured to generate x-rays in response to electron bombardment by at least some of the electrons of the at least one electron beam from the electron source. The x-ray source further comprises at least one x-ray optic within the at least one housing. The at least one x-ray optic is configured to receive at least some of the x-rays from the anode assembly and to direct at least some of the received x-rays to the window to form an x-ray beam.

DETAILED DESCRIPTION

X-ray sources with conventional x-ray/vacuum windows are not compatible with applications that seek to utilize low-energy x-rays (e.g., less than 1 keV). For many applications, low energy x-rays offer advantages (e.g., large ionization cross sections for most elements in the periodic table, especially elements with low atomic numbers, referred to as low-Z elements). For many applications, low energy x-rays with certain x-ray spectral property are desired (e.g., narrow spectral bandwidth for generating photoelectrons of low kinetic energies and narrow energy spread; specific x-ray energies for optimizing the ionization cross sections of selected elements). Low energy x-rays with high flux, especially x-rays of energies less than 1 keV, outside the vacuum vessel can be desirable and/or critical for various applications.

Conventional x-ray sources have difficulty meeting these desirable attributes due to the conflicting requirements of the x-ray system and the vacuum system. To increase the output x-ray flux for low energy x-rays (e.g., having more low energy x-rays exit the window), it can be desirable to have a window with a high x-ray transmittance for low energy x-rays and to have a window sufficiently large so low energy x-rays propagating over a large emission angle can pass through the window. While having a thin window made from low-Z elements can provide the high x-ray transmittance for low energy x-rays, such thin windows are typically fragile, especially if the thin window is sufficiently large to receive low-energy x-rays over a large emission angle. Furthermore, such a large, thin window would need to survive various harsh conditions in producing and processing the x-ray source (e.g., high temperature bakeout; pressure differentials between the two sides of the window; transportation from manufacturers to customers).

In addition, to generate characteristic x-rays of energies below 1 keV while generating less Bremsstrahlung radiation, anode materials comprising mostly low-Z elements (e.g., boron to fluorine) can be desired since the amount of Bremsstrahlung radiation generated from the anode materials is proportional to the mean atomic numbers (Z) of the anode materials. Because it can be desirable to have an electrically conductive path (e.g., to ground) from the anode material to prevent charging by the incident electrons, and bulk low-Z materials typically are insulators (except for B and C), metals of atomic number greater than 12 (the atomic number of Mg) are often used as the anode material, resulting in substantial Bremsstrahlung radiation.

Figure 1A:
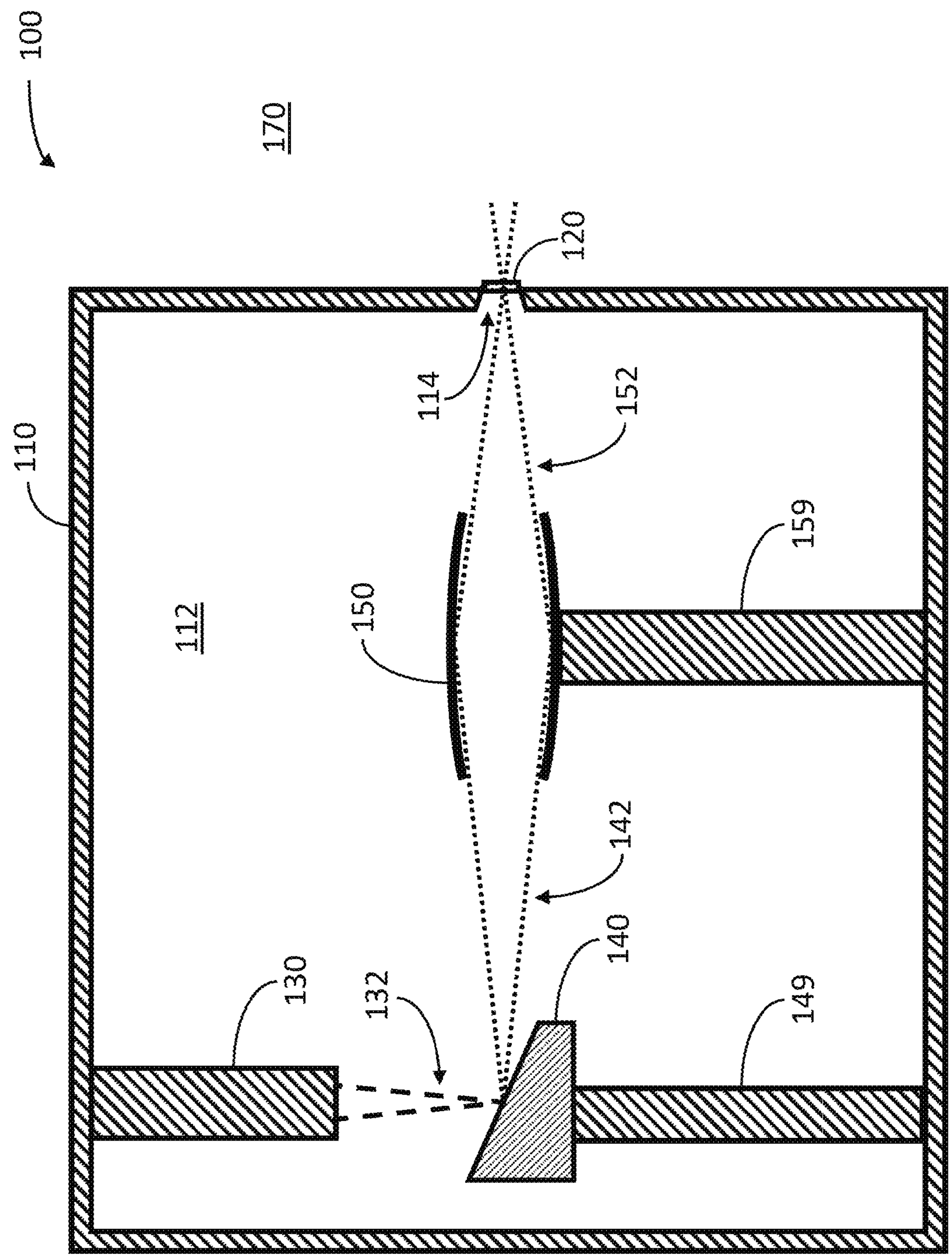
FIGS. 1A and 1B schematically illustrate cross-sectional views of two example x-ray sources for generating x-rays in accordance with certain implementations described herein.

FIG. 1A schematically illustrates a cross-sectional view of an example x-ray source 100 for generating x-rays in accordance with certain implementations described herein. The example x-ray source 100 comprises at least one housing 110 (e.g., vacuum vessel) configured to contain a first region 112 at vacuum (e.g., pressure less than $10^{-4}$ torr; less than less than $10^{-6}$ torr; less than less than $10^{-8}$ torr; less than 1 torr) and configured to separate the first region 112 from a second region 170 (e.g., ambient environment) outside the at least one housing 110. The at least one housing 110 comprises an x-ray transmissive window 120 having an x-ray transmittance greater than or equal to 20% for at least some x-rays having an x-ray energy less than 1 keV (e.g., less than 0.5 keV; less than 0.3 keV). The example x-ray source 100 further comprises an electron source 130 (e.g., electron column) within the at least one housing 110 and configured to generate at least one electron beam 132 (e.g., a collimated electron beam; a focused electron beam; a converging electron beam). The example x-ray source 100 further comprises an anode assembly 140 within the at least one housing 110 and configured to generate x-rays 142 (e.g., a divergent x-ray beam) in response to electron bombardment by at least some of the electrons of the at least one electron beam 132 from the electron source 130. The example x-ray source 100 further comprises at least one x-ray optic 150 within the at least one housing 110 and configured to receive (e.g., collect) at least some of the x-rays 142 from the anode assembly 140 and to direct at least some of the received x-rays 142 to the window 120 to form an x-ray beam 152 (e.g. a collimated x-ray beam: a focused x-ray beam; a converging x-ray beam). The at least one x-ray optic 150 can comprise at least one monocapillary lens, at least one polycapillary lens, a KB mirror pair, a zone plate, a plurality of monocapillary lenses nested along a common axis, or a Wolter optic. In certain implementations, the at least one x-ray optic 150 comprises a reflective mirror optic having at least a portion of the mirror surface with a quadric surface profile in at least one direction (e.g., elliptic; parabolic; hyperbolic; ellipsoidal; paraboloidal; hyperboloidal).

In certain implementations, the x-ray beam 152 has a cross-sectional area perpendicular to the propagation direction of the x-ray beam 152, and the cross-sectional area is a function of distance from the at least one x-ray optic 150 (e.g., the cross-sectional area at a first location a first distance from the at least one x-ray optic 150 differs from the cross-sectional area at a second location a second distance from the at least one x-ray optic 150, the second distance greater than the first distance). The cross-sectional area can have a minimal value (e.g., a minimal area as compared to the cross-sectional areas at all other locations along the propagation direction of the x-ray beam 152 from the at least one x-ray optic 150) at a position 160 (e.g., focal point of the at least one x-ray optic 150; position of the smallest beam waist of the x-ray beam 152), the position 160 at or near the window 120 (e.g., at a location within 30 millimeters of the window 120; within 20 millimeters of the window 120; within 5 millimeters from the window 120; within 2 millimeters from the window 120; within 1 millimeter from the window 120; the position 160 can be within the first region 112, coincident with the window 120, or outside the at least one housing 110). For example, the x-ray beam 152 at the position 160 (e.g., the waist of the x-ray beam 152) can have a cross-sectional width (e.g., diameter) in a range of 3 microns to 300 microns, 10 microns to 1 millimeter, less than 2 millimeters, less than 200 microns, and/or less than 50 microns and/or a cross-sectional area in a range of 100 square microns to 5 square millimeters (e.g., 0.004 square millimeter to 5 square millimeters; 0.01 square millimeter to 5 square millimeters).

Figure 1B:
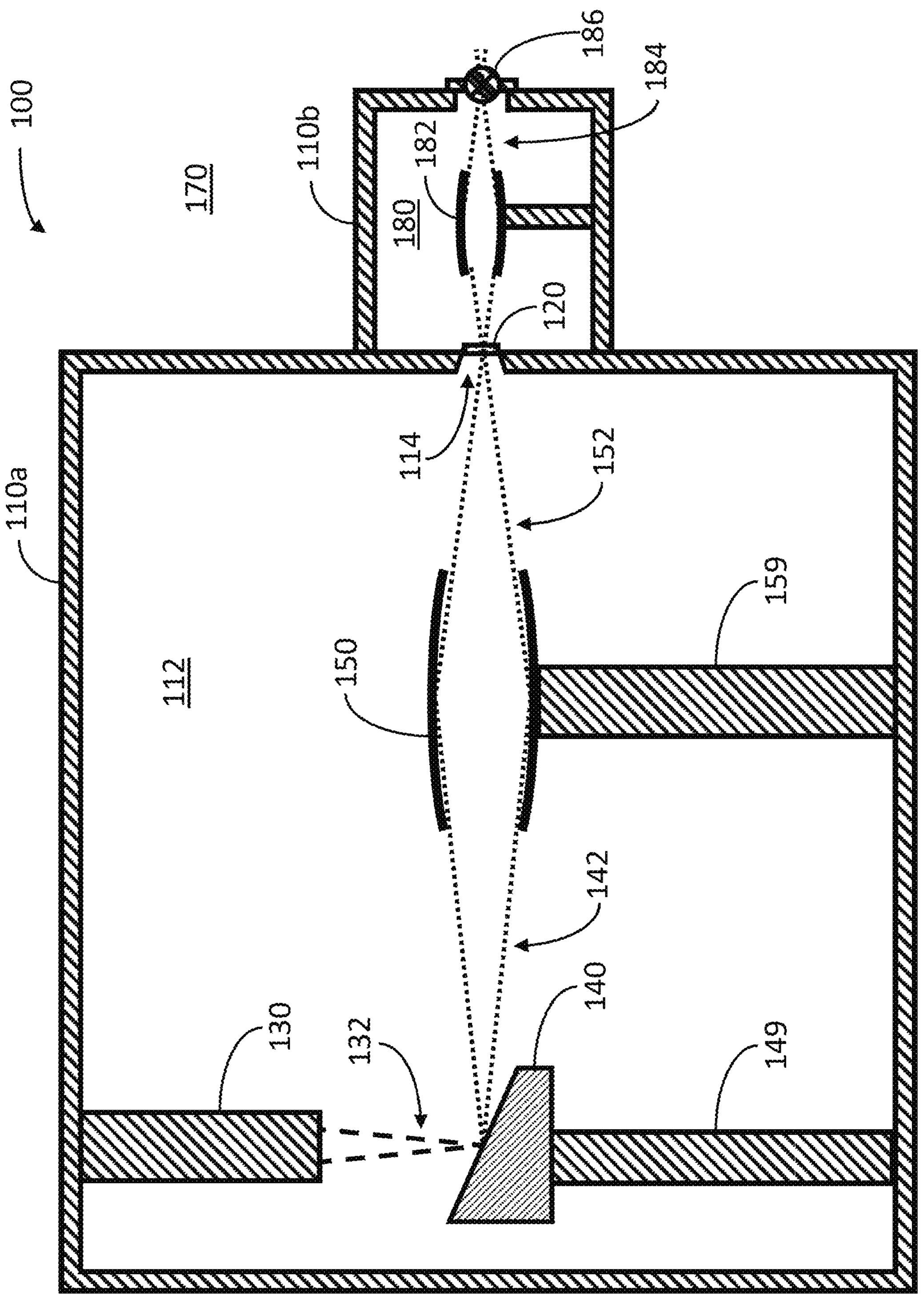

FIG. 1B schematically illustrates a cross-sectional view of another example x-ray source 100 in accordance with certain implementations described herein. The at least one housing 110 of FIG. 1B comprises a first housing 110*a* (e.g., a first vacuum vessel) and a second housing 110*b* (e.g., a second vacuum vessel). The first housing 110*a* is configured to contain the first region 112 at vacuum (e.g., pressure less than $10^{-4}$ torr; less than $10^{-6}$ torr; less than $10^{-8}$ torr; less than 1 torr) and configured to separate the first region 112 from the second region 170 (e.g., ambient environment) outside the first housing 110*a*. The first housing 110*a* also contains the electron source 130, the anode assembly 140, and the at least one x-ray optic 150. The second housing 110*b* is configured to contain a third region 180 under vacuum, with the window 120 between the first region 112 and the third region 180. In certain implementations, the second housing 110*b* is rigidly attached to the first housing 110*a*. In certain implementations, the second housing 110*b* is removable from the first housing 110*a*.

In certain implementations, the second housing 110*b* comprises at least one second x-ray optic 182 within the third region 180, the at least one second x-ray optic 182 configured to receive at least some of the x-rays of the x-ray beam 152 transmitted through the window 120 and to condition the received x-rays (e.g., in spectral property and/or angular distribution) to transmit a second x-ray beam 184 (e.g., a collimated x-ray beam; a focused x-ray beam; a converging x-ray beam). The at least one second x-ray optic 182 can comprise at least one monocapillary lens, at least one polycapillary lens, a KB mirror pair, a zone plate, a plurality of monocapillary lenses nested along a common axis, or a Wolter optic. In certain implementations, the at least one second x-ray optic 182 comprises a reflective mirror optic having at least portion of the mirror surface with a quadric surface profile in at least one direction (e.g., ellipstic, parabolic, hyperbolic, ellipsoid, paraboloid, hyperboloid). For example, the at least one second x-ray optic 182 can comprise an ellipsoidal surface (e.g., having a first focus within 2 millimeters from the window 120 and a second focus within 2 millimeters from an opening of the second housing 110*b*) or a pair of substantially symmetric paraboloidal surfaces (e.g., a first paraboloidal surface having a first focus within 2 millimeters from the window 120 and a second paraboloidal surface having a second focus within 2 millimeters from an opening of the second housing 110*b*). For example, the at least one second x-ray optic 182 can be configured to receive (e.g., collect) x-rays of the x-ray beam 152 transmitted through the window 120 (e.g., diverging x-rays) and to direct at least some of the received x-rays from the window 120 to form the second x-ray beam 184 (e.g., a collimated x-ray beam; a focused x-ray beam; a converging x-ray beam).

The second housing 110*h* can further comprise at least one vacuum valve 186 at the opening of the second housing 110*b* and configured to controllably separate the third region 180 from the second region 170 (e.g., ambient environment). The at least one vacuum valve 186 can comprise a gate valve (e.g., manually or pneumatically operated) and can be used to protect the window 120 (e.g., during vacuum baking of the x-ray source 100) and/or to facilitate transportation and storage of components within the second housing 110*b*.

In certain implementations, the at least one vacuum valve 186 can be controllably opened to allow the second x-ray beam 184 from the at least one second x-ray optic 182 to propagate out of the second housing 110*b* (e.g., to a sample being analyzed downstream of the at least one vacuum valve 186). In certain such implementations, the window 120 can separate the first region 112 that is at a first vacuum pressure (e.g., less than 1 torr; less than $10^{-4}$ torr; less than $10^{-6}$ torr; less than $10^{-8}$ torr) from the third region 180 that is at a second vacuum pressure that is less than atmospheric pressure but is greater than the first vacuum pressure (e.g., in a range of 1 torr to 500 torr; in a range of 20 torr to 200 torr). Such a configuration can avoid having a large pressure differential across the window 120 and the window 120 can be sufficiently thin to transmit a substantial fraction of the low energy x-rays while having a larger width (e.g., 1 millimeter or more).

In certain implementations (e.g., as shown in FIGS. 1A and 1B), the electron source 130, the anode assembly 140, and the at least one x-ray optic 150 are within a single chamber within the first region 112, while in certain other implementations, the first region 112 comprises a plurality of chambers having walls between two or more of the electron source 130, the anode assembly 140, and the at least one x-ray optic 150.

Figure 2:
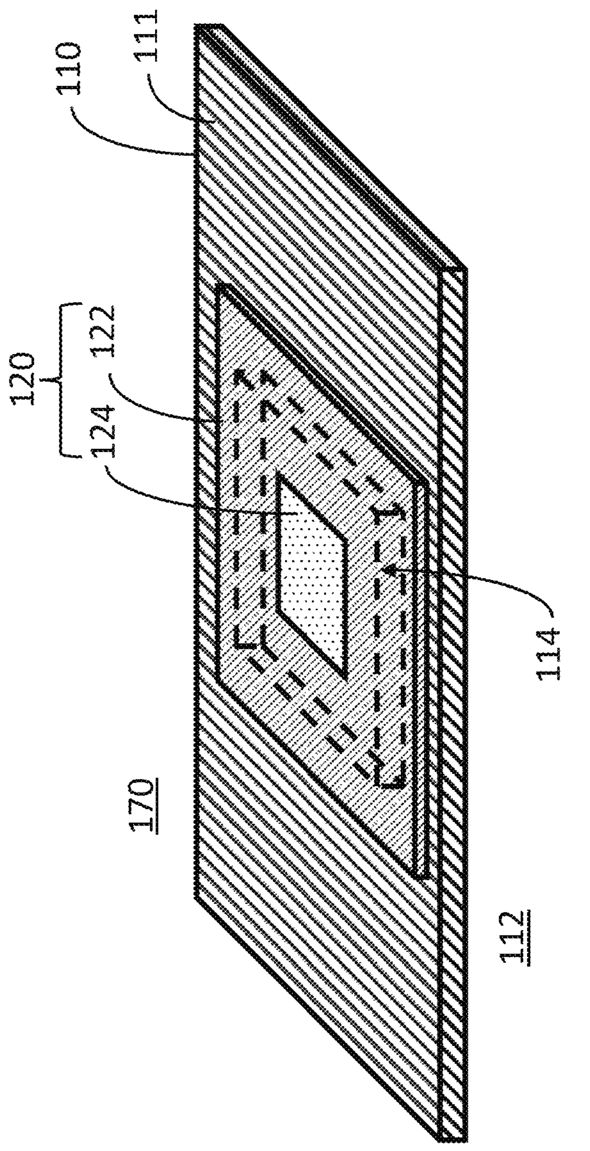
FIG. 2 schematically illustrates a perspective view of a portion of an example x-ray transmissive window in accordance with certain implementations described herein.

FIG. 2 schematically illustrates a perspective view of a portion of an example x-ray transmissive window 120 in accordance with certain implementations described herein. In certain implementations, the at least one housing 110 comprises one or more metal (e.g., stainless steel) walls 111 surrounding the first region 112 which is under vacuum pressure (e.g., less than 1 torr; less than $10^{-4}$ torr; less than $10^{-6}$ torr; less than $10^{-8}$ torr) and sealed from the second region 170 (e.g., at ambient pressure) outside the housing 110. In certain implementations, as shown in FIG. 2, at least one of the walls 111 comprises an aperture 114 extending through the wall 111 and the window 120 is mounted and sealed over the aperture 114 (e.g., the window 120 configured to seal the first region 112 from the second region 170 or from the second housing 110*b*). For example, the aperture 114 can have a substantially square or substantially rectangular shape, with a transverse width in a range of 0.1 millimeter to 10 millimeters (e.g., a first width in a first transverse direction of 200 microns and a second width in a second transverse direction substantially perpendicular to the first transverse direction of about 2 millimeters). The transverse width of the aperture 114 can be smaller than a transverse width of the window 120 (e.g., facilitating mounting of the window 120 to the wall 111). In certain implementations, as shown in FIG. 2, the window 120 is mounted on an outer surface of the wall 111 (e.g., a surface facing the second region 170), while in certain other implementations, the window 120 is mounted on an inner surface of the wall 111 (e.g., a surface facing the first region 112). For example, the window 120 can be fabricated on and supported by a silicon frame (e.g., having a thickness in a range of 200 microns to 400 microns) scaled to the wall 111 using a vacuum-compatible adhesive (e.g., epoxy sealant; TorrSeal® available from Kurt J. Lesker Co. of Jefferson Hills, PA), an O-ring seal, or brazing. In certain implementations, the window 120 is attached to the wall 111 by a vacuum bellows between the window 120 and the wall 111 with a vacuum-tight seal.

In certain implementations, the window 120 is configured to withstand (e.g., maintain) a pressure differential between the first region 112 within the at least one housing 110 (e.g., at a first pressure less than 1 atmosphere) and the second region 170 outside the at least one housing 110 (e.g., at a second pressure greater than the first pressure).

In certain implementations, the window 120 comprises a substrate 122 (e.g., frame) and an x-ray transmissive element 124 (e.g., a membrane; plate) affixed to the substrate 122. The substrate 122 can be affixed (e.g., mounted and sealed) to the wall 111 surrounding the aperture 114 and the element 124 can be affixed (e.g., mounted and sealed) to the substrate 122 over the aperture 114. The element 124 can have a thickness that is less than 1 micron, less than 0.2 micron, and/or less than 0.05 micron. The materials of the transmission element 124 and the substrate 122 can be the same as one another or can be different from one another. In certain implementations, in which the materials of the transmission element 124 and the substrate 122 are different from one another, the transmission element 124 and the substrate 122 can be attached to one another with a vacuum-tight seal.

In certain implementations, the x-ray transmissive element 124 of the window 120 has an x-ray transmittance greater than 20% for x-rays having energies in a range (e.g., bandwidth) less than 1 keV. In certain implementations, the element 124 has at least one dimension (e.g., a first width perpendicular to the propagation direction of the x-ray beam 152; a second width perpendicular to the propagation direction of the x-ray beam 152 and perpendicular to the first width) less than or equal to 5 millimeters (e.g., less than or equal to 1 millimeter; less than or equal to 0.3 millimeter; less than or equal to 0.1 millimeter). In certain implementations, the element 124 is configured to allow at least some of the x-ray beam 152 to propagate from the at least one x-ray optic 150 in the first region 112 within the at least one housing 110 to the second region 170 outside the at least one housing 110 (see, e.g., FIG. 1A). The element 124 can comprise at least one low-Z material (e.g., diamond, graphene, aluminum, aluminum hydroxide, silicon, silicon carbide, silicon nitride, lithium fluoride, boron carbide, beryllium, beryllium oxide) and can have a thickness less than 500 nanometers (e.g., less than 100 nanometers; less than 50 nanometers). In certain implementations, the element 124 comprises a metal layer (e.g., having a thickness less than or equal to 100 nanometers) on the at least one low-Z material, the metal layer configured to provide sufficiently high transmittance of the x-ray beam 152 (e.g., greater than or equal to 20% for a thickness of 20 nanometers) and spectral filtering of the x-ray beam 152. Examples of metals compatible with certain implementations described herein include, but are not limited to: Al, Ti, Cr, Fe, Co, Re, Rh, Pd, Ag, and La. In certain implementations, the metal layer can be configured to block low energy photons (e.g., less than 50 eV) generated inside the region 112 from exiting through the window 120.

In certain implementations, the x-ray transmissive window 120 comprises a plurality of x-ray transmissive elements 124 to simplify the alignment of the x-ray beam 152 with the window 120. In certain implementations, the at least one housing 110 comprises a plurality of x-ray transmissive windows 120, the individual windows 120 comprising different x-ray transmissive elements 124 from one another and providing different x-ray spectral transmission properties as one another (e.g., such that the x-rays transmitted through the different windows 120 have different spectral properties from one another). For example, the at least one x-ray optic 150 can be moved to direct the x-ray beam 152 to impinge and pass through a selected x-ray transmissive element 124 of the plurality of x-ray transmissive elements 124. For another example, the plurality of x-ray transmissive elements 124 can be mounted on a flange that is connected to the at least one housing 110 by an assembly comprising a bellows configured to be adjusted (e.g., moved) to have the x-ray beam 152 impinge and pass through a selected x-ray transmissive element 124 of the plurality of x-ray transmissive elements 124 (e.g., a selected window 120 of the plurality of windows 120 in a path of the x-ray beam 152) and a brace configured to prevent collapse of the bellows due to the force of ambient pressure on one side of the bellows and vacuum pressure on the other side of the bellows.

In certain implementations, the aperture 114 of the at least one housing 110 and the window 120 are at a fixed position relative to other portions of the at least one housing 110, while in certain other implementations, the aperture 114 and the window 120 are configured to be moved relative to other portions of the at least one housing 110. For example, the at least one housing 110 can comprise a bellows between a first portion and a second portion of the at least one housing 110, the first portion comprising the aperture 114 (with the window 120 affixed over the aperture 114) and in mechanical communication with a stage configured to adjust a position of the aperture 114 and the window 120 relative to the x-ray beam 152. The stage can be moved (e.g., along a single direction or along two or three directions orthogonal to one another) such that the aperture 114 and/or the window 120 are at or near a minimum cross-sectional area (e.g., waist) of the x-ray beam 152.

Figure 3:
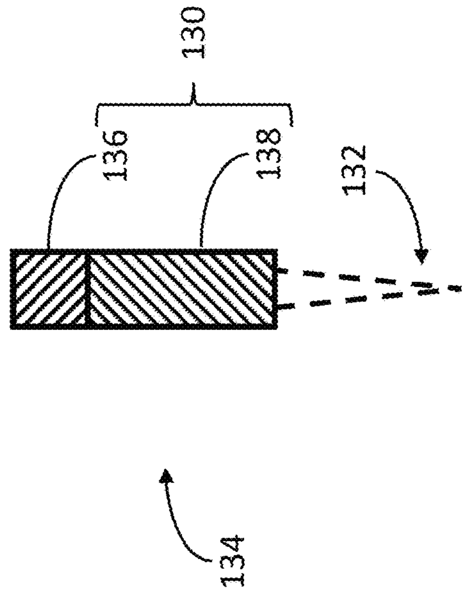
FIG. 3 schematically illustrates an example electron source in accordance with certain implementations described herein.

FIG. 3 schematically illustrates an example electron source 130 compatible with certain implementations described herein. In certain implementations, the electron source 130 is configured to generate at least one electron beam 132 comprising electrons having a range of kinetic energies (e.g., a range from 0.5 keV to 5 keV; a range from 5 keV to 50 keV). For example, the electron source 130 can comprise an electron optic column 134 having at least one cathode 136 and an electron optics subsystem 138. The at least one cathode 136 can be configured to emit electrons (e.g., comprising at least one electron emitter including but not limited to tungsten spiral wires or filaments, carbon nanotubes, dispensers, lanthanum hexaboride, etc.). The electron optics subsystem 138 can comprise one or more grids and/or electrodes configured to direct, accelerate, and/or shape the electrons emitted from the at least one cathode 136 to form the at least one electron beam 132 and to adjust a position and/or orientation of the at least one electron beam 132 relative to the anode assembly 140. In certain implementations, the electron optic column 134 is configured to focus the at least one electron beam 132 onto a surface of the anode assembly 140 with a focal spot size in at least one direction (e.g., substantially perpendicular to an electron beam propagation direction) being in a range less than or equal to 200 microns, less than or equal to 50 microns, and/or less than or equal to 10 microns. In certain implementations, the electron focal spot has a shape elongated with an aspect ratio in a range of 1.5 to 10. The at least one cathode 136 and the electron optics subsystem 138 can be configured to be in electrical communication with control electronics outside the at least one housing 110 via one or more electrical feedthroughs (not shown).

Figure 4:
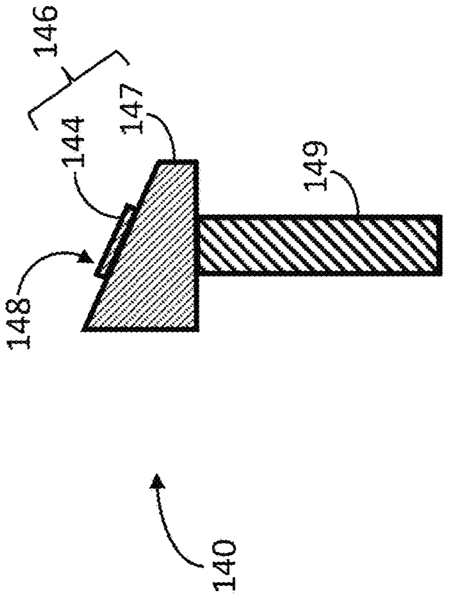
FIG. 4 schematically illustrates a portion of an example anode assembly in accordance with certain implementations described herein.

FIG. 4 schematically illustrates a portion of an example anode assembly 140 in accordance with certain implementations described herein. In certain implementations, the anode assembly 140 comprises at least one anode 146 comprising at least one target structure 144 comprising one or more materials selected for their x-ray generation properties (e.g., desired spectral properties) when bombarded (e.g., impacted) by the at least one electron beam 132. The at least one anode 146 can further comprise an electrically conductive substrate 147 in thermal communication with the at least one target structure 144. The substrate 147 of certain implementations is configured to receive thermal energy from the at least one target structure 144, the thermal energy generated by the electron bombardment of the at least one target structure 144 by the at least one electron beam 132, and to dissipate and/or transfer thermal energy away from the at least one target structure 144.

In certain implementations, the at least one anode 146 has an electrically conductive path from the at least one target structure 144 to the substrate 147 and the substrate 147 has an electrically conductive path to ground such that the substrate 147 is configured to prevent electrical charging of the at least one target structure 144 by the at least one electron beam 132. In certain implementations, the at least one target structure 144 comprises at least one ceramic layer 148 in thermal communication with the substrate 147 and having a thickness that is sufficiently thin for electrons to tunnel through the at least one ceramic layer 148 to the substrate 147 (e.g., having a thickness in a range of 0.1 micron to 10 microns) to prevent electrical charging of the at least one ceramic layer 148 by the at least one electron beam 132. In certain implementations, the at least one ceramic layer 148 comprises at least one material configured to generate x-rays 142 having predetermined x-ray spectral properties in response to bombardment by the at least one electron beam 132. In certain implementations, the at least one ceramic layer 148 has a surface facing the at least one electron beam 132, the surface having a surface normal direction that is oriented at an angle (e.g., in a range of 0 degrees to 80 degrees) relative to the propagation direction of the at least one electron beam 132.

For example, the at least one ceramic layer 148 can comprise at least one material (e.g., boride, carbide, nitride, oxide, and fluoride) comprising at least one low-Z element (e.g., lithium, beryllium, boron, carbon, nitrogen, oxygen, and fluorine). The at least one low-Z element can generate x-rays 142 having (i) characteristic K line or L line x-ray energies that are less than 1 keV and that have narrow spectral line widths (e.g., less than 2 eV), and (ii) high intensity ratio of characteristic K line or L line x-rays 142 to Bremsstrahlung radiation x-rays. In certain implementations, the spectral line width of the x-rays 142 is sufficiently narrow to optimize photoelectron production cross section, kinetic energy, and chemical state analysis for x-ray photoelectron spectroscopy and the intensity ratio of the K line x-rays 142 to Bremsstrahlung radiation x-rays is sufficiently high to provide a quasi-monochromatic x-ray spectrum. In certain implementations, the spectral line width of the x-rays 142 is sufficiently narrow to optimize a signal-to-noise ratio for x-ray fluorescence analysis of low energy characteristic fluorescence x-rays for semiconductor thin film and material metrology applications, with the intensity ratio of the K line x-rays 142 to Bremsstrahlung radiation x-rays being sufficiently high to provide a quasi-monochromatic x-ray spectrum. In certain implementations, the energy of the K line x-rays 142 is selected to optimize the fluorescence cross section of certain element of interest above the absorption edge of the element (e.g., 100 cV above the absorption edge).

In certain implementations, the at least one target structure 144 comprises at least one layer containing at least one element in the third or fourth rows of the periodic table or at least one compound of such an element with a low-Z element (e.g., BeO, $B_4C$, MgO, $Al_2O_3$, SiC, $CaB_6$, diamond/graphite, LiF, and $TiB_2$). For compounds with low electrical conductivity, the substrate 147 can provide an electrically conductive path (e.g., to ground) to prevent electrical charging of the at least one anode 146 by the at least one electron beam 132. For example, the at least one target structure 144 can comprise a ceramic layer 148 comprising MgO (e.g., configured to generate Mg K and L x-ray emission line x-rays and O K x-ray emission line x-rays) on an underlying diamond structure of the substrate 147 in thermal communication with a metal (e.g., Cu) portion of the substrate 147

(e.g., the diamond structure on or embedded in a surface of the metal portion of the substrate 147). The at least one target structure 144 can comprise at least one thermally and/or electrically conductive layer between the MgO ceramic layer 148 and the diamond structure and/or between the diamond structure and the metal portion of the substrate 147.

In certain implementations, the at least one target structure 144 further comprises at least one additional target structure 144 (e.g., spaced from the target structure 144 comprising the low-Z element, the at least one additional target structure 144 comprising at least one metal (e.g., Ti, Sc, V, Cr, Cu, Fe, Co, Ni, Zr, Mo) configured to generate x-rays 142 having predetermined spectral properties (e.g., characteristic x-rays having energies less than or equal to 1 keV; characteristic x-rays having energies greater than 1 keV). Examples of other additional target structures 144 compatible with certain implementations described herein are disclosed by U.S. Pat. Nos. 10,658,145, 10,401,309, 10,352,880, 10,349,908, 10,304,580, 10,297,359, 10,295, 485, 10,269,528, 9,874,531, 9,823,203, 9,719,947, 9,594, 036, 9,570,265, 9,543,109, 9,570,265, 9,449,781, 9,448,190, and 9,390,881, each of which is incorporated in its entirety by reference herein.

In certain implementations, the at least one target structure 144 comprises a plurality of target structures 144 (e.g., on a common substrate 147), the materials of the target structures 144 configured to undergo electron bombardment by the at least one electron beam 132 and to generate x-rays 142 having predetermined spectral properties, the x-rays from different materials having different spectral properties from one another (e.g., different K and L x-ray emission lines). For example, individual target structures 144 can comprise individual thin layers containing elements selected for producing characteristic x-rays of energies less than 1 keV. For example, individual target structures 144 can comprise MgO, SiC, and $CaB_6$ with MgO to produce Mg K and L emission line x-rays and O K emission line x-rays, SiC to produce C Kα emission line x-rays with 288 eV energy and Si Lα emission line x-rays with 98 eV energy, and $CaB_6$ to produce Ca La emission line x-rays with 345 eV energy and B Kα emission line x-rays with 198 eV energy.

In addition to characteristic x-rays with energies less than 1 keV, the at least one target structure 144 of certain implementations provides characteristic x-rays with higher energies, which can be useful for many experiments (e.g., producing photoelectrons with higher kinetic energy using Ca Kα line x-rays than with Ca L line x-rays). For example, $Al_2O_3$ can provide Kα line x-rays having energies greater than 1 keV, and Mo can provide K line x-rays and L line x-rays having energies greater than 1 keV, in addition to their respective characteristic lines of energies less than 1 keV.

In certain implementations, the at least one electron beam 132 and/or the at least one anode 146 are configured to be moved (e.g., positioned) such that the at least one electron beam 132 is incident on the at least one target structure 144 at angles in a range from 30 degrees to 90 degrees with respect to a surface normal direction of the at least one target structure 144. Using lower incidence angles, the penetration depth of the incident electrons 132 into the at least one target structure 144 and the x-ray production from deeper portions of the at least one target structure 144 can be reduced, leading to lower attenuation of x-rays from the x-ray production point to the target structure surface.

In certain implementations, the anode assembly 140 is in mechanical communication with a stage 149 configured to adjust a position and/or orientation of the at least one target structure 144 relative to the at least one electron beam 132 from the electron source 130. For example, the stage 149 can be configured to move the at least one target structure 144 along a single direction or along two or three directions (e.g., orthogonal to one another) and/or to rotate the at least one target structure 144 about a single axis or about two or three axes (e.g., orthogonal to one another). In certain implementations, a first portion of the stage 149 is within the at least one housing 110 and a second portion of the stage 149 is outside the at least one housing 110 (e.g., the first portion and second portion in operative communication with one another via an electrical and/or mechanical feedthrough that is mounted on or is a component of the at least one housing 110). In certain implementations comprising a plurality of target structures 144, the stage 149 is configured to move the plurality of target structures 144 relative to the at least one electron beam 132 inside the at least one housing 110 (e.g., to select one of the target structures 144 to be irradiated by the at least one electron beam 132).

Figure 5:
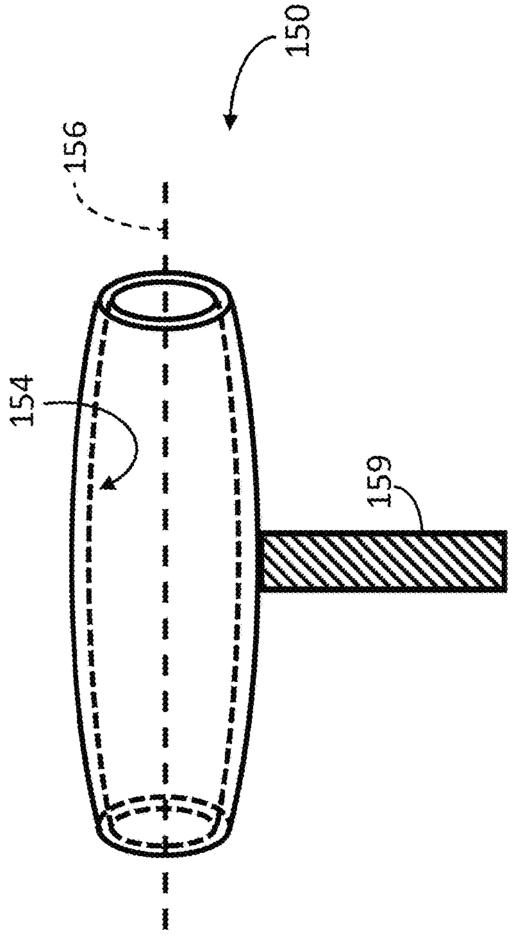
FIG. 5 schematically illustrates an example x-ray optic in accordance with certain implementations described herein.

FIG. 5 schematically illustrates an example at least one x-ray optic 150 in accordance with certain implementations described herein. In certain implementations, the at least one x-ray optic 150 comprises at least one functional (e.g., x-ray reflective) surface 154 having at least one segment of quadric shape (e.g., ellipsoidal, hyperboloidal, paraboloidal) and extending at least partially around an axis 156 by an axial angle greater than or equal to 30 degrees (e.g., greater than 60 degrees; greater than 90 degrees; greater than 180 degrees; surrounding the axis 154 and axially symmetric). The at least one functional surface 154 can comprise at least one coating of at least one material (e.g., single layer; multilayer) different from the material of the at least one functional surface 154, the at least one coating configured to achieve sufficiently high x-ray reflectivity and/or sufficiently large critical angles. The at least one functional surface 154 can comprise a plurality of quadric surfaces (e.g., a Wolter optic). In certain other implementations, the at least one x-ray optic 150 comprises at least one transmission zone plate.

The at least one x-ray optic 150 of certain implementations is configured to receive (e.g., collect) at least some of the diverging x-rays 142 generated by the anode assembly 140 in response to the at least one electron beam 132 (e.g., focused electron beam) impacting the at least one target structure 144, and to direct at least some of the received x-rays 142 to form and output the x-ray beam 152 (e.g., a collimated x-ray beam; a focused x-ray beam; a converging x-ray beam). For example, the x-ray beam 152 can be convergent with a minimum cross-sectional width that is less than or equal to 1 millimeter (e.g., less than or equal to 0.2 millimeter; less than 0.05 millimeter) in at least one direction in a plane perpendicular to the propagation direction of the x-ray beam 152.

In certain implementations, the at least one x-ray optic 150 is configured to be aligned (e.g., positioned and/or oriented) such that a minimum cross-sectional area (e.g., waist at the position 160) of the x-ray beam 152 is at or near the window 120. For example, the at least one x-ray optic 150 can be adjusted by at least one linear motion and/or rotational motion stage 159. Example ranges of the dimensions of the waist of the x-ray beam 152 at the position 160 include but are not limited to: less than 2 millimeters in at least one direction in the cross-sectional plane, less than 200 microns in at least one direction in the cross-sectional plane, and/or less than 50 microns in at least one direction in the cross-sectional plane. For example, for a converging x-ray beam 152, the minimum cross-sectional width of the x-ray beam 152 (e.g., the position 160 at which the x-ray beam 152 is focused; the position 160 of the minimum waist of the x-ray beam 152) can be at (e.g., coincident with) the window 120 or spaced from a surface of the window 120 (e.g., a surface facing the first region 112 within the at least one housing 110; a surface facing the second region 170 outside the at least one housing 110) by a distance that is less than 2 millimeters, less than 200 microns, and/or less than 50 microns. The at least one second x-ray optic 182 can be similar to the at least one x-ray optic 150 (e.g., having substantially the same shape and geometric parameters).

By having the position 160 of the minimum cross-sectional width of the x-ray beam 152 at or near the window 120, certain implementations can enable the window 120 to be sufficiently small to have sufficient mechanical strength to maintain a pressure differential between the first region 112 within the at least one housing 110 and the second region 170 outside the at least one housing 110, while also providing an x-ray transmittance greater than or equal to 20% for a substantial portion of the x-ray beam 152 having an x-ray energy less than 1 keV. The at least one x-ray optic 150 of certain such implementations can also enable the x-ray flux transmitted through the window 120 to be substantially larger than without the at least one x-ray optic 150. In this way, certain implementations transmit at least a portion of the x-ray beam 152 through the window 120 for use outside the at least one housing 110. In certain implementations, the at least one x-ray optic 150 also conditions the input x-ray spectrum (e.g., preferentially suppressing x-rays of energies above a preselected x-ray energy using a reflection mirror optic with a selected maximum incidence angle, or using a mirror optic with a surface coated with multilayers).

In certain implementations, the at least one x-ray optic 150 is in mechanical communication with a stage 159 configured to adjust a position and/or orientation of the at least one x-ray optic 150 relative to the at least one target structure 144 (e.g., relative to the x-rays 142 from the anode assembly 140). For example, the stage 159 can be configured to move the at least one x-ray optic 150 along a single direction or along two or three directions (e.g., orthogonal to one another) and/or to rotate the at least one x-ray optic 150 about a single axis or about two or three axes (e.g., orthogonal to one another). For example, the stage 159 can be wholly within the at least one housing 110, or a first portion of the stage 159 can be within the at least one housing 110 and a second portion of the stage 159 can be outside the at least one housing 110 (e.g., the first portion and second portion in operative communication with one another via an electrical and/or mechanical feedthrough that is mounted on or is a component of the at least one housing 110). In certain implementations comprising a plurality of x-ray optics 150, the stage 159 is configured to move the plurality of x-ray optics 150 relative to the x-rays 142 inside the at least one housing 110 (e.g., to select at least one of the x-ray optics 150 to receive the x-rays 142).

In certain implementations, the stage 159 is configured to adjust the position and/or orientation of the at least one x-ray optic 150 relative to other portions of the x-ray source 100 (e.g., the anode assembly 140; the window 120) such that the x-ray beam 152 passes through the window 120 to the second region 170 (e.g., the minimum waist of the x-ray beam 152 is at or near the window 120). In certain implementations, adjusting the propagation direction of the x-ray beam 152 so that the x-ray beam 152 impinges on the window 120 comprises adjusting the position and/or orientation of the at least one x-ray optic 150 (e.g., using the stage 159). In certain implementations, adjusting the propagation direction of the x-ray beam 152 further comprises adjusting the position and/or orientation of the anode assembly 140 (e.g., using the stage 149) and/or adjusting the position and/or orientation of the at least one electron beam 132 (e.g., using the electron optics subsystem 138). For example, aligning the converging x-ray beam 152 to pass through the window 120 can comprise mechanically positioning the at least one x-ray optic 150 while the position of the focused electron beam 132 on the anode assembly 140 remains stationary, mechanically or electronically displacing the focused electron beam 132 on the anode assembly 140 while the at least one x-ray optic 150 remains stationary, or a combination of both.

In certain implementations, the x-ray source 100 further comprises an x-ray detector within the first region 112 configured to be positioned upstream of the window 120. The x-ray detector can be configured to facilitate alignment of the at least one x-ray optic 150 in the first region 112 so as to focus the x-ray beam 152 at the desired position (e.g., at or on the window 120). The x-ray detector can comprise a direct electronic array detector or a scintillation screen observable using a CCD-based viewing system, and can comprise a hole positionable at the desired focal position and through which the x-ray beam 152 can propagate. In certain implementations, the x-ray detector can be mounted on a stage configured to controllably move the x-ray detector (e.g., into the path of the x-ray beam 152 or out of the path of the x-ray beam 152).

Although commonly used terms are used to describe the systems and methods of certain implementations for case of understanding, these terms are used herein to have their broadest reasonable interpretations. Although various aspects of the disclosure are described with regard to illustrative examples and implementations, the disclosed examples and implementations should not be construed as limiting. Conditional language, such as “can,” “could,” “might,” or “may,” unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase “at least one of X, Y, and Z.” unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms “approximately,” “about.” “generally,” and “substantially,” represent a value, amount, or characteristic close to the stated value, amount, or characteristic that still performs a desired function or achieves a desired result. For example, the terms “approximately.” “about,” “generally,” and “substantially” may refer to an amount that is within +10% of, within +5% of, within +2% of, within +1% of, or within +0.1% of the stated amount. As another example, the terms “generally parallel” and “substantially parallel” refer to a value, amount, or characteristic that departs from exactly parallel by +10 degrees, by +5 degrees, by +2 degrees, by +1 degree, or by +0.1 degree, and the terms "generally perpendicular" and "substantially perpendicular" refer to a value, amount, or characteristic that departs from exactly perpendicular by +10 degrees, by +5 degrees, by +2 degrees, by +1 degree, or by +0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An x-ray source comprising:

at least one housing configured to contain a first region at a pressure less than one atmosphere and configured to separate the first region from an ambient environment outside the at least one housing, the at least one housing comprising an x-ray transmissive window having an x-ray transmittance greater than or equal to 20% for at least some x-rays having an x-ray energy less than 1 keV;

an electron source within the at least one housing, the electron source configured to generate at least one electron beam;

an anode assembly within the at least one housing and configured to generate x-rays in response to electron bombardment by at least some of the electrons of the at least one electron beam from the electron source;

at least one x-ray optic within the at least one housing, the at least one x-ray optic configured to receive at least some of the x-rays from the anode assembly and to direct at least some of the received x-rays to the window to form an x-ray beam.

2. The x-ray source of claim 1, wherein a cross-sectional area of the x-ray beam has a local minimum value at a focal point of the at least one x-ray optic.

3. The x-ray source of claim 1, wherein the x-ray transmissive window has an x-ray transmittance greater than or equal to 20% for at least some x-rays having an x-ray energy less than 0.5 keV.

4. The x-ray source of claim 1, wherein the x-ray transmissive window has an x-ray transmittance greater than or equal to 20% for at least some x-rays having an x-ray energy less than 0.3 keV.

5. The x-ray source of claim 1, wherein the x-ray transmissive window comprises a plurality of x-ray transmissive elements, the at least one x-ray optic or the x-ray transmissive window configured to be adjusted to have the x-ray beam impinge a selected x-ray transmissive element of the plurality of x-ray transmissive elements.

6. The x-ray source of claim 1, wherein the x-ray transmissive window comprises at least one x-ray transmissive element selected from the group consisting of: diamond, graphene, aluminum, aluminum hydroxide, silicon, silicon carbide, silicon nitride, lithium fluoride, boron carbide, beryllium, and beryllium oxide.

7. The x-ray source of claim 1, wherein the at least one electron beam comprises a focused electron beam and wherein the x-rays generated by the anode assembly comprise a divergent x-ray beam.

8. The x-ray source of claim 1, wherein the x-ray beam from the at least one x-ray optic comprises a focused x-ray beam.

9. The x-ray source of claim 1, wherein the x-ray beam from the at least one x-ray optic has a cross-sectional area perpendicular to a propagation direction of the x-ray beam from the at least one x-ray optic, the cross-sectional area is a function of distance from the at least one x-ray optic.

10. The x-ray source of claim 1, wherein the at least one housing comprises:

a first housing configured to contain the first region at a pressure less than 1 atmosphere and configured to separate the first region from the second region outside the first housing, the first housing containing the electron source, the anode assembly, and the at least one x-ray optic; and a second housing configured to contain a third region, the window located between the first region and the third region.

11. The x-ray source of claim 1, wherein a wall of the at least one housing comprises an aperture extending through the wall, and wherein the window is mounted and sealed over the aperture.

12. The x-ray source of claim 1, wherein the electron source comprises an electron optic column having at least one cathode configured to emit electrons and an electron optics subsystem configured to direct, accelerate, and/or shape the electrons emitted from the at least one cathode to form the at least one electron beam and to adjust a position and/or orientation of the at least one electron beam relative to the anode assembly.

13. The x-ray source of claim 1, wherein the anode assembly comprises at least one anode comprising at least one x-ray generating target structure and an electrically conductive substrate in thermal communication with the at least one target structure, wherein the at least one x-ray generating target structure is configured to generate x-rays when bombarded by the at least one electron beam, and wherein the substrate is configured to dissipate and/or transfer thermal energy away from the at least one target structure.

14. The x-ray source of claim 1, wherein the at least one x-ray optic comprises at least one x-ray reflective surface having at least one segment of a quadric shape, and wherein the at least one x-ray reflective surface extends at least partially around an axis by an axial angle greater than or equal to 30 degrees.

15. The x-ray source of claim 2, wherein the local minimum value at the focal point is in a range of 100 square microns to 5 square millimeters.

16. The x-ray source of claim 2, wherein the focal point is within 30 millimeters from the window.

17. The x-ray source of claim 2, wherein the focal point is within the first region.

18. The x-ray source of claim 2, wherein the focal point is coincident with the window.

19. The x-ray source of claim 2, wherein the focal point is outside of the at least one housing.

20. The x-ray source of claim 10, further comprising at least one second x-ray optic within the third region and configured to receive x-rays of the x-ray beam transmitted through the window and to direct at least some of the received x-rays from the window to form a second x-ray beam.

21. The x-ray source of claim 10, wherein the second housing further comprises at least one vacuum valve configured to controllably separate the third region from the second region.

22. The x-ray source of claim 11, wherein the window comprises a substrate and an x-ray transmissive element, wherein the substrate affixed to a portion of the wall surrounding the aperture, and wherein the x-ray transmissive and the element is affixed to the substrate over the aperture.

23. The x-ray source of claim 22, wherein the at least one housing comprises a bellows between a first portion and a second portion of the at least one housing, the first portion comprising the aperture and in mechanical communication with a stage configured to adjust a position of the aperture and the window relative to the x-ray beam.

24. The x-ray source of claim 12, wherein the electron optic column is configured to focus the at least one electron beam onto a surface of the anode assembly with a focal spot size in at least one direction substantially perpendicular to an electron beam propagation direction, the focal spot size in a range less than or equal to 200 microns.

25. The x-ray source of claim 13, wherein the at least one anode has an electrically conductive path from the at least one x-ray generating target structure to the substrate, and wherein the substrate has an electrically conductive path to ground.

26. The x-ray source of claim 13, wherein the at least one x-ray generating target structure comprises at least one ceramic layer in thermal communication with the substrate, and wherein the at least one ceramic layer has a thickness in a range of 0.1 micron to 10 microns.

27. The x-ray source of claim 13, wherein the at least one x-ray generating target structure comprises a first target structure comprising at least one x-ray generating material selected from the group consisting of: BeO, $B_4C$, MgO, $Al_2O_3$, SiC, $CaB_6$, diamond/graphite, LiF, and $TiB_2$.

28. The x-ray source of claim 26, wherein the at least one ceramic layer comprises at least one element selected from the group consisting of: lithium, beryllium, boron, carbon, nitrogen, oxygen, and fluorine.

29. The x-ray source of claim 27, wherein the at least one x-ray generating target structure further comprises a second target structure spaced from the first target structure, the second target structure comprising at least one metal selected from the group consisting of: Ti, Sc, V, Cr, Cu, Fe, Co, Ni, Zr, and Mo.

30. The x-ray source of claim 14, wherein at least one x-ray reflective surface comprises a first material, wherein the at least one x-ray optic further comprises at least one layer on the at least one x-ray reflective surface, and wherein the at least one layer comprises a second material different from the first material.

* * * * *